United States Patent
Zhang et al.

(10) Patent No.: US 7,908,631 B1
(45) Date of Patent: Mar. 15, 2011

(54) DEPLOYING TWO-WAY INTERACTIVE SERVICE OVER A ONE-WAY NETWORK

(75) Inventors: Ji Zhang, Monte Sereno, CA (US);
Hain-Ching Liu, Fremont, CA (US);
Jiangang Ding, San Jose, CA (US)

(73) Assignee: Software Site Applications, Limited Liability Company, Wilmington, DE (US)

( * ) Notice: Subject to any disclaimer, the term of this patent is extended or adjusted under 35 U.S.C. 154(b) by 1392 days.

(21) Appl. No.: 10/393,707

(22) Filed: Mar. 20, 2003

Related U.S. Application Data

(60) Provisional application No. 60/367,446, filed on Mar. 21, 2002.

(51) Int. Cl.
*H04N 7/173* (2006.01)
(52) U.S. Cl. ............... 725/105; 370/389; 370/395.3; 370/395.32; 348/734
(58) Field of Classification Search .......... 725/123, 725/119
See application file for complete search history.

(56) References Cited

U.S. PATENT DOCUMENTS

| | | | | |
|---|---|---|---|---|
| 5,642,337 A * | 6/1997 | Oskay et al. | ............... | 709/230 |
| 5,805,155 A * | 9/1998 | Allibhoy et al. | ............... | 725/115 |
| 5,880,720 A * | 3/1999 | Iwafune et al. | ............... | 725/24 |
| 6,359,661 B1 * | 3/2002 | Nickum | ............... | 348/734 |
| 6,456,851 B1 | 9/2002 | Sucharczuk et al. | | |
| 6,609,253 B1 * | 8/2003 | Swix et al. | ............... | 725/88 |
| 6,704,575 B1 * | 3/2004 | Fujita | ............... | 455/462 |
| 6,804,708 B1 * | 10/2004 | Jerding et al. | ............... | 709/220 |
| 7,089,580 B1 * | 8/2006 | Vogel et al. | ............... | 725/111 |
| 7,360,230 B1 * | 4/2008 | Paz et al. | ............... | 725/47 |
| 2002/0044225 A1 * | 4/2002 | Rakib | ............... | 348/734 |
| 2002/0053082 A1 * | 5/2002 | Weaver et al. | ............... | 725/46 |
| 2002/0080736 A1 * | 6/2002 | Furukawa | ............... | 370/328 |
| 2003/0002638 A1 * | 1/2003 | Kaars | ............... | 379/110.01 |
| 2003/0030751 A1 * | 2/2003 | Lupulescu et al. | ............... | 348/552 |
| 2003/0131355 A1 * | 7/2003 | Berenson et al. | ............... | 725/46 |
| 2005/0028208 A1 * | 2/2005 | Ellis et al. | ............... | 725/58 |

OTHER PUBLICATIONS

RFC 2543, Internet RFC/STD/FY1/BCP Archives, Network Working Group by M. Handley et al "SIP: Session Initiation Protocol" (34 pgs.).

3GPP TSG SAWG2#11, Puerto Vallarta, Mexico, Jan. 24-28, 1999, *Release 2000 Architecture*(8 pgs.).

3GPP, ETSI TS 123 002 V3.3.0 (Mar. 2000) Technical Specificatio, Digital Cellular Telecommunications System (Phase 2+) (GSM); Universal Mobile Telecommunications System (UMTS); Network architecture (3G TS 23.002 version 3.3.0 Release 1999) (39 pgs.).

\* cited by examiner

*Primary Examiner* — Brian T Pendleton
*Assistant Examiner* — Jason K Lin
(74) *Attorney, Agent, or Firm* — Stolowitz Ford Cowger LLP

(57) ABSTRACT

Systems and methods for deploying two-way data communication over a one-way infrastructure are disclosed. An end user enters a control command into an input device that is capable of sending data containing the control command over a network to a content service provider. The content service provider adjusts the end user's output stream in accordance with the end user's control command. The adjusted output stream is distributed to the output display device. Further features are disclosed such as providing content descriptive metadata to the input device and/or the output display device.

18 Claims, 5 Drawing Sheets

DEPLOYING TWO-WAY INTERACTIVE SERVICE OVER A ONE-WAY NETWORK

RELATED APPLICATION

This application is related to U.S. provisional patent application Ser. No. 60/367,446 filed on Mar. 21, 2002, entitled "Deploying Two-Way Interactive Service Over One-Way Network," from which priority is claimed under 35 U.S.C. §119(e) and which application is incorporated by reference herein in its entirety.

TECHNICAL FIELD

This invention relates generally to network communications and, more particularly, to providing two-way data transmission over a one-way service network.

BACKGROUND

Many of the world's broadband media distribution networks, such as satellite based direct broadcasting services (DBS), digital ground-based broadcasters (e.g., digital television (DTV) and multichannel multipoint distribution service (MMDS)) as well as traditional cable service providers, provide only one-way data transmission. Conventionally, these one-way broadband networks do not provide a reverse path for the individual end user to transmit commands or requests through their output display device back to the service provider. For example, with DBS, the service provider is a data transponder satellite, which typically does not have the capability to receive uplink data from the individual end users. Therefore, the customers, or end users, of these service providers, typically, have no control over the data that is broadcast to them. End users, thereby, only receive the digital content that the service provider sends out over its network. These service providers, typically, supply service to millions of end users.

Converting a one-way cable network to a two-way return path cable network is typically a capital expense that is too great for many service providers to incur. Even if the service providers are capable of providing two-way communication through their networks, end users may still only receive one-way service if they have out-of-date equipment, such as set-top boxes or output display devices. Older output display devices do not have return path capability or do not have the required output display device software to support two-way communication. Further, these service providers may not have the financial resources to replace or update their older output display devices for millions of end users.

Conventional one-way content distribution networks limit a service provider's ability to offer high revenue premium services such as pay-per-view movies, digital music, video games, sporting events or other paid services. With one-way distribution networks, no direct method from the output display device exists for the end user, for example, to select, cancel or control (i.e., fast forward, rewind, pause, stop, etc.) the premium service ordered.

In one conventional approach, the one-way network service providers have enabled limited reverse path communications to the service provider by means of a conventional telephone landline. However, this solution requires the output display device to be connected to a telephone line. This prerequisite creates a problem when the output display device is not located in the vicinity of a convenient telephone jack. In addition, a telephone connection between the end user and the service provider must be established before the end user may issue commands or requests and must remain connected throughout the duration period required by the end user to control the media output.

The use of a telephone landline to control the premium services may result in delays of several minutes in establishing connection during peak end user demand times due to end users encountering busy signals or having their calls dropped. In addition, the end users may incur great expense if the telephone connection results in toll or long-distance charges. Further, the use of the telephone landline may be inconvenient to the end user if the connection prevents the telephone landline to be employed for other purposes during the time used for media output control.

What is needed, therefore, are systems and methods that provide a reverse path for the individual end user to control the content service provider output stream in areas that have one-way broadcasting networks. What is further needed are systems and methods that provide a reverse path for the individual end user to control the content service provider output stream without the requirement of a telephone landline.

SUMMARY OF THE INVENTION

An embodiment of the present invention provides a method for two-way communication between a content service provider and the end user over a one-way service network through the use of a mobile wireless input device. The end user enters a command into the input device for controlling an output display device. The input device, then, in turn, communicates the end user's control command to a command receiver, which may be located with the input device service provider. In one embodiment, the command receiver converts the end user control command into data packet suitable for network transmission and sends the data packet to a network. The network, then, in turn, transmits the end user control command to the content service provider, which alters the output stream in accordance with the control command sent by the end user.

In a further embodiment of the present invention, a content server provides an output stream to an output display device. The output stream can be in a conventional digital video transmission format such as Moving Picture Experts Group (MPEG). The content server can include content descriptive information with the output stream for processing or display on the output display device. Content descriptive information can be, for example, a program title and/or a program description.

In another embodiment, the content server can overlay content descriptive information (e.g., program time remaining) responsive to the end user making a request for the content descriptive information using the end user input device. In this case, the content server overlays the requested information on the output stream being sent to the output display device located in the end user's premises. Further, the content server can send content descriptive information to the input device. The input device can display the content descriptive information and can request that the content server provide additional supplemental information.

Another embodiment of the present invention provides a method of two-way communication between the content service provider and the end user over a one-way service network by utilizing a mobile wireless input device in conjunction with a command receiver. The end user enters a command for controlling an output display device into the input device, which, in turns, sends the end user's control command to a command receiver that is located within end user's premises. In one embodiment, the command receiver translates the end user control command into a data packet suitable for network transmission and sends it to a network. The network transmits the end user control command to the output device content server, which then alters the output stream in accordance with the control command sent by the end user and sends the altered output stream to the output display device via a distribution network.

Further features of the invention, its nature and various advantages will be more apparent from the accompanying drawings and the following detailed description.

BRIEF DESCRIPTION OF THE DRAWINGS

The accompanying drawings illustrate several embodiments of the invention and, together with the description, serve to explain the principles of the invention.

DETAILED DESCRIPTION OF THE EMBODIMENTS

The present invention is now described more fully with reference to the accompanying figures, in which several embodiments of the invention are shown. The present invention may be embodied in many different forms and should not be construed as limited to the embodiments set forth herein. Rather these embodiments are provided so that this disclosure will be thorough and complete and will fully convey the invention to those skilled in the art.

One skilled in the art will further appreciate that methods, apparatus, systems, data structures, and computer program products implement the features, functionalities, or modes of usage described herein. For example, a system embodiment can perform the corresponding steps or acts of a method embodiment.

One advantage of the present invention is that an input device that is communicatively coupled to a network (e.g., a universal remote control, mobile cellular telephone, pagers, and personal digital assistants (PDAs)) can be used to provide reverse path connectivity to a content service provider to control content that is being delivered via a distribution network.

One type of network to which an input device can be coupled is a wireless communication system such as the Global System for Mobile (GSM) communication, which has become the worldwide leader in the digital wireless market. By the end of December 2002, GSM had 787.5 million customers in 191 countries accounting for approximately seventy-one percent of the total digital wireless market. General Packet Radio Service (GPRS) built upon GSM and consists of packet-based communication resulting in continuous connection to the Internet for mobile cell phones and computer users. GPRS is considered to be less expensive to the end user because its communication channels are used on a shared-use, as-packets-are-needed basis as opposed to the dedicated to only one user at a time mode of conventional wireless devices.

Further, some wireless communication systems employ Wideband Code Division Multiple Access (WCDMA). WCDMA has been adopted as a standard by the International Telecommunications Union (ITU) under the name IMT-2000 direct spread. WCDMA allows end users to send voice, images, data and video through their digital wireless device. Other wireless technologies are becoming popular in the home and business environment. Two such technologies are wireless local area network (WLAN), which utilizes the IEEE 802.11(b) standard, and the Bluetooth protocol. Both of which provide a wireless (i.e., radio frequency (RF) or infrared) connection between devices in the home or business.

A. Delivery of Content to an Output Display Device

Figure 1:
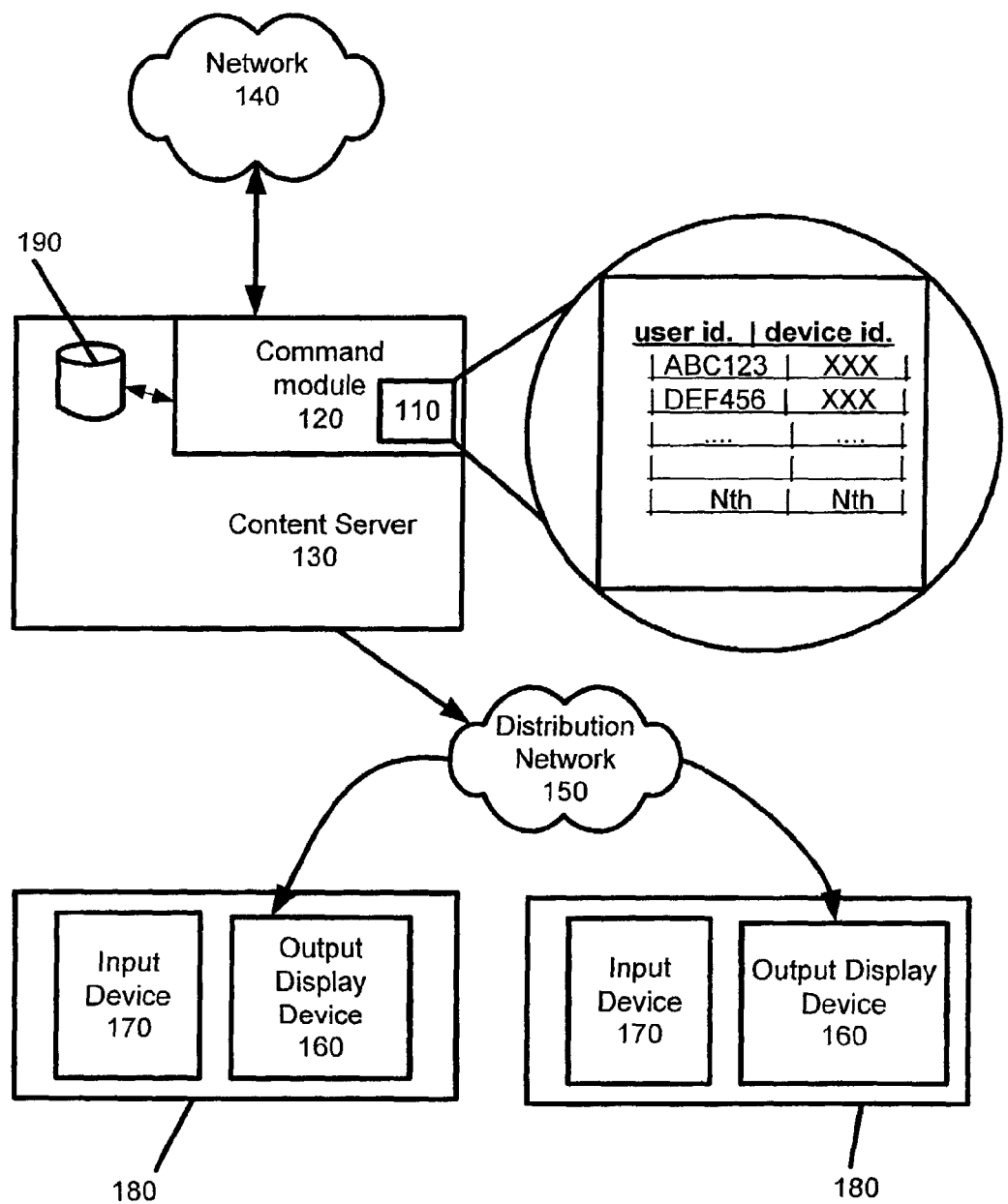
FIG. 1 is a system diagram illustrating content distribution in accordance with the present invention.

FIG. 1 is a system diagram illustrating content distribution in accordance with the present invention. The illustrated embodiment includes a content server 130. The content server 130 incorporates a command module 120 and a subscriber database 190. The subscriber database 190 is communicatively coupled to the command module 120. In the illustrated embodiment, the command module 120 includes a data look-up table 110. The command module 120 is further coupled to a network 140. The network 140 can be a public or private data network. The content server 130 is connected to a distribution network 150. The distribution network 150 is linked to a plurality of premises 180. In the illustrated embodiment, an output display device 160 and an input device 170 are located within each premise 180.

The network 140 sends a data packet to the command module 120. The command module 120 parses the data packet into its individual fields. The data within these fields is then sent to the content server 130. The content server 130 provides a selection of content including premium services. In addition, the content server 130 includes content descriptive information or metadata about the content that is in the media library of the content server 130. For example, for movies the title, plot summary, movie duration time, and any other information associated with the movie can be included in the content descriptive metadata.

The content server 130 delivers content via the distribution network 150. The distribution network 150 delivers an output stream to one or more output display devices 160 located within the premises 180. In one embodiment, the content server 130 includes content descriptive metadata with the output stream. In one embodiment of the present invention, the output display device 160 can produce appropriate screen overlays or images that include the content descriptive metadata. In another embodiment, the content server 130 can generate screen overlays or images and integrate those overlays or images into the output stream for subsequent display on the output display device 160.

Via the input device 170, an end user issues a command that controls the output stream displayed on at least one output display device 160 located in the individual premises 180. The end user control command is contained within the data packet sent to the network 140. In addition, the data packet includes identifying information for the output display device 160 associated with the end user control command.

One skilled in the art will recognize that such identifying information may be, for example, end user name; a serial number; physical address; or any other feasible method to identify the end user and the output display device. The network 140 can be public, supplied by the service provider of the input device 170, or any other network capable of transmitting data. The network 140 may transmit the data packets using the Internet protocol (IP) or any other suitable protocol.

After the command module 120 parses the data packet into the end user control command and the end user identifying information, the command module 120 uses the end user identifying information included in the data packet to determine which output display device 160 the end user would like controlled. In one embodiment of the invention, the command module 120 employs the use of a data look-up table 110 to determine the correct output display device 160. One skilled in the art will recognize that the data look-up table 110 may be, for example, a linear table, a hash table, a linked list, a tree-like data structure, a database or any other method capable of storing, updating, and searching for the correct output display device 160.

The data look-up table 110 includes records associating an input device 170 with an output display device 160. One field, the end user field, is used for identifying the end user issuing the end user control command. Another field, the output display device field, is used for identifying the output display device 160 associated with the end user. The command module 160 uses the end user identifying information to search the records within the data look-up table 110 for the corresponding output display device 160. The record fields can be predefined if, for example, there is only one output display device 160 associated for each input device 170. In addition, the record fields can be dynamically assigned during operation.

In one embodiment, the subscriber database 190 contains records of the end users subscribed to the content service provider's network and the identifying information of the end user's output display devices 160 that are connected to the content service provider's distribution network 150. Each output display device 160 record in the subscriber database 190 has an end user associated with it.

In one embodiment, the data look-up table 110 is populated by accessing the subscriber database 190. The data look-up table 110 becomes populated the first time the end user enters commands into the input device 170 to control the output stream of the output display device 160. In one embodiment, the end user is prompted to enter the identifying information of the output display device 160 to be controlled (e.g., the serial number of the output display device 160). The end user can enter the identifying information by logging into the input device 170 and manually entering the output display device 160 identifying information by using, for example, a keypad or a touch screen. In another example embodiment, the input device 170 receives a signal from the output display device 160 that contains the output display device 160 identifying information. For example, Bluetooth can be used to transmit the serial number of the output display device 160 to the input device 170. The identifying information can be in any of the forms described above and entered into the input device 170 in numerous other ways, as one skilled in the art will appreciate. This identifying information is then sent by data packet to the command module 120.

The command module 120, after parsing the data packets, searches the data look-up table 110 for the end user identifying information. If the information is not found, the command module 120 queries the subscriber database 190 for the output display device 160 identifying information. Once the record is found in the subscriber database 190, the data look-up table 110 creates a record containing the newly found end user identifying information and the output display device 160 identifying information. If a record is not found in the subscriber database 190, the output display device 160 is not part of the content service provider's distribution network 150 and a record is not created in the data look-up table 110.

Once the command module 120 determines the output display device 160 to be controlled, the command module 120 forwards the output display device 160 identifying information with the end user control command to the content server 130. The content server 130 acts on the end user control command and alters the output stream intended for the output display device 160 in accordance with the end user's control command. In one embodiment, the output stream is compressed. The alterations or modifications that the content server 130 can perform include, for example, stopping, pausing, rewinding, fast-forwarding or updating the menu shown on the output display device 160.

Figure 5:
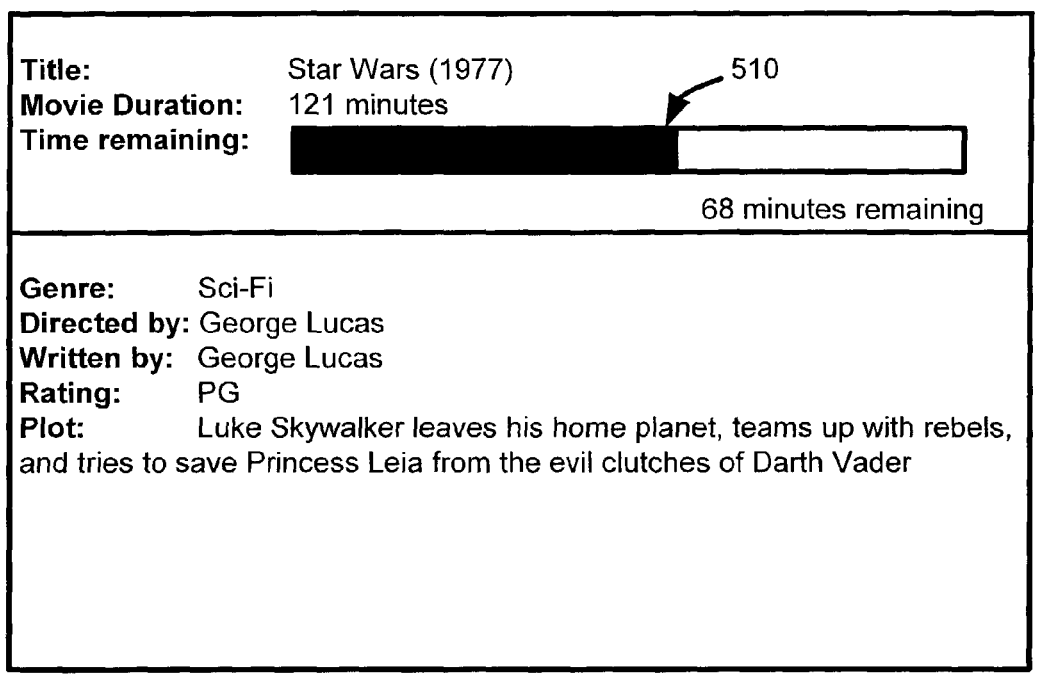
FIG. 5 is an illustration of a display of content descriptive metadata information according to one embodiment of the present invention.

In another embodiment, the content server 130 includes content descriptive metadata with the output stream sent. This content descriptive metadata can contain textual, graphical, audio or other multimedia information associated with the output stream. The content server 130 can store instructions on the capabilities of the output display device 160 to receive and to process supplemental data such as the content descriptive metadata. In one embodiment, the content server 130 sends the output stream along with the content descriptive metadata to at least one output display device 160 for display. The information contained in the content descriptive metadata can be displayed on the output display device 160 as a banner that is overlaid on top of the output stream. As described in further detail below, FIG. 5 illustrates one example of the appearance of the banner or overlay.

In another embodiment, the content server 130 can send content descriptive metadata to the input device 170 via the network 140. For example, the input device 170 can request from the content server 130 a program title. The program title information can then be sent to the input device 170 for display on the input device 170. The content server 130 can concurrently deliver the output stream to the output display device 160. The content descriptive information can be in hypertext markup language (HTML) format or in any other suitable format.

If the output stream is altered, the content server 130 sends the altered output stream by way of the content server provider's distribution network 150. The distribution network 150 sends the output stream to the output display device 160 associated with the end user, which, then, processes and displays the altered output stream in accordance to the end user control command. In one embodiment, if the output stream is stopped or paused, no output stream is sent to the distribution network 150 for display on the output display device 160. In another embodiment, if the output stream is stopped or paused, the same frame of the output stream is continually sent for display to the output display device 160.

For example, in response to a "pause" end user control command, the content server 130 suspends sending the output stream via the distribution network 150 to the end user's output display device 160. In another example, in response to a "rewind" end user control command, the content server 130 displays the output stream in reverse order to the end user output display device 160. For example, if the output stream is displaying content in Moving Pictures Experts Group (MPEG) format, the content server 130 sends packets of earlier played content in reverse order to the output display device 160. The output stream continues to run in reverse order until the beginning of the content is reached at which point the output stream stops or the output stream continues to run in reverse order until a subsequent end user control command is received via the network 140.

In another embodiment, the output display device 160 displays as the output stream menu information of the content options available to the end user. In one embodiment, the menu information is encoded as part of the output stream. Here the content server 130 pre-encodes a screen shot that includes the menu options. In another embodiment, the content server 130 sends the menu options to the output display device 160. The output display device 160 can then produce a screen overlay or image in order to display the menu options to the end user. One skilled in the art will appreciate that the content of the menu is dependent on the services available and the services requested by the end user.

In another embodiment, the menu information is included in the content descriptive metadata sent along with the output stream. The content descriptive metadata is in a format that the output display device 160 can process and display. For example, the content options menu can include the premium service options such as the pay-for-view movies available. End user control commands can be used for menu navigation, (e.g., up, down, right, left, or select). The content server 130 acts on the end user control command by updating the options menu to reflect the end user control command choice.

For example, in response to a "down" end user control command to the menu that displays the pay-for-view movies available, the highlighted menu choice moves down one selection to highlight the next movie available on that list. The content server 130 then alters the output stream to reflect the updated options menu screen shot. The content server 130 sends the altered output stream with the updated options menu screen shot to the distribution network 150. In one embodiment, the distribution network 150 sends the content descriptive metadata sent with the output stream to the output display device 160 associated with the end user, which, then, displays the altered content descriptive metadata sent with the output stream as, for example, a banner than overlays the output stream in accordance to the end user control command.

B. Delivery of Commands by Input Device

Figure 2:
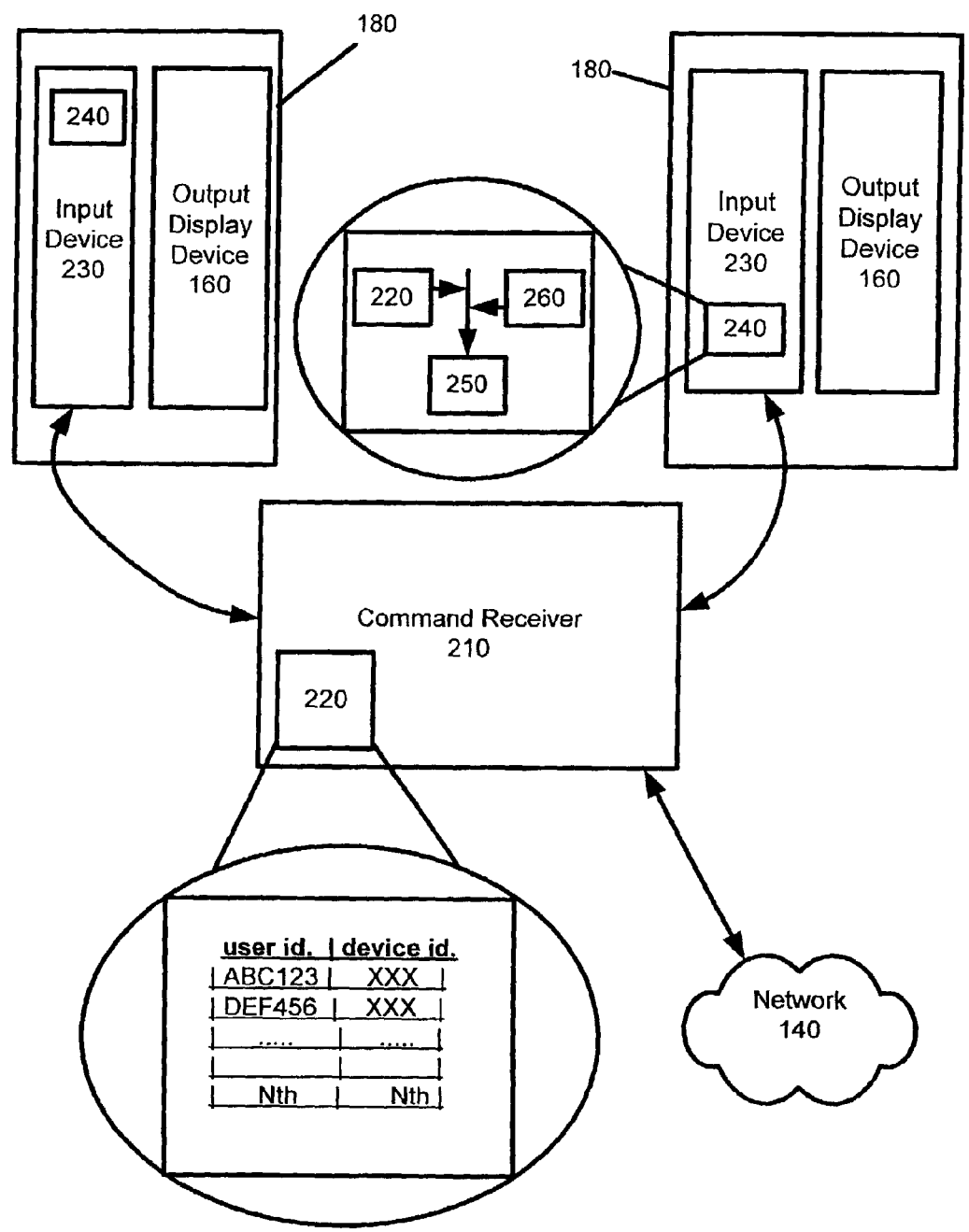
FIG. 2 is a system diagram illustrating return path communication according to an embodiment of the present invention.

FIG. 2 is a system diagram illustrating return path communication according to an embodiment of the present invention. The illustrated embodiment includes a plurality of premises 180. Each premises 180 includes an input device 230 and an output display device 160. The input device 230 includes a data packet-generating module 240. The data-generating module 240 communications the data packet 250 to a command receiver 210. In one embodiment, within the command receiver 210, there is a data look-up table 220 of data records. The data look-up table 220 can also reside in the data packet-generating module 240. The command receiver 210 sends data to a network 140. The command receiver 210 can also receive content descriptive metadata from the network 140.

In the illustrated embodiment, the data packet-generating module 240 including the data look-up table 220, illustrated as a flow chart, uses program instructions to combine the end user control command 260 with the output display device 160 identifying information from the data look-up table 220 into data packets 250. In another embodiment, the data packet-generating module 240 which does not includes the data look-up table 220 uses program instructions to send only the end user control command 260 into data packets 450.

In this embodiment, in order to control the output display device 160, the end user enters a command 260 into input device 230. The input device 230 could be any mobile hand-held wireless digital device into which an end user could enter a control command 260 such as, for example, a digital mobile telephone, a digital pager, a universal remote control, or a personal digital assistant (PDA).

In one embodiment, the end user logs into the input device 230 by using, for example, a key pad or a touch screen, so that the input device 230 is configured to accept control commands 260 corresponding to functions the end user would like to use to control the output stream of the output display device 160 such as, for example, pause, fast forward, rewind, and menu navigation. Additionally, the input device 230 can include controls for requesting content descriptive metadata from the content server 130. The end user may request static information about the output stream, such as program title, or dynamic information, such as time remaining in the program. In another embodiment, the end user can manually enter into the input device 230 the output display device 160 identifying information for the output display device 160 that the end user wishes to control. In another embodiment, the output device 160 identifying information can be received by the input device 230 from a signal sent by the output device 160. For example, Bluetooth can be used to transmit the serial number of the output display device 160 to the input device 230. If the input device 230 receives signals from more than one output display device 160 located within the premises 180, the end user can be prompted to select the output display device 160 to be controlled.

In another embodiment, the input device 230 has pre-programmed static inputs (e.g., buttons) to correspond to end user control commands 260. In yet another embodiment, the end user changes the mode of the input device 230 by a switch or other means correlating the functionality of the inputs of the input device 230 to the controls for the output display device 160 by, for example, the use of soft keys or changing the touch screen appearance. The output display device 160 identifying information can be predefined or dynamically assigned to the end user control command 260 as described above.

The input device 230 packages the end user control command 260 into a data packet 250 and sends the data packet 250 via the input device service provider network protocol to the command receiver 210. The input device service provider network is, typically, a proprietary network. The input device service provider network can be, for example, a wireless mobile telephone network.

1. IP-Enabled Data Packets

In one embodiment, the input device 230 in conjunction with the data-packet generating module 240 produces data packets 250 capable of network transmission (e.g., Internet protocol (IP) packets that can be routed to a wide area network such as the Internet). In this embodiment, the end user enters the control command 260 into the input device 230. The output display device 160 identifying information, also, is included within the data packet-generating module 240 in a data look-up table 220. One method of grouping the identifying information for the output display device 160 with the end user involves employing a look-up table 220. In one embodiment, the data look-up table 220 correlates the end user with the output display device 160 into fields of the data records corresponding to the data records included in the command module 120 as described above.

The data look-up table 220 can be populated with identifying information sent by the input device service provider who receives the data from the content service provider via an agreement. In one embodiment, the content service provider and the input device service provider exchange customer information so that the end user's output display device 160 from the content service provider can be affiliated with the end user's input device 230 from the input device service provider. This information can then be used to populate the records of the data look-up table 220 correlating the end user with a particular output display device 160.

The data packet-generating module 240 then encapsulates the data containing the end user control command 260 and the output display device 160 identifying information into a data packet 250 capable of network transmission. One format for the data packet 250 is IP but other data structures or protocols are possible and may be utilized. The data packet-generating module 240 relays the data packet 250 to the command receiver 210.

In another embodiment, the command receiver 210 resides outside the premises 180. For example, the command receiver 210 is located at the same site as the input device service provider, or located on an input device service provider relaying tower or any other similar location. After receiving the data packets 250, the command receiver 210 determines whether the data packets 250 are capable for network transmission as relayed from the data packet-generating module 240. The data packet 250 is in a protocol recognized by the network 140.

If the data packets 250 are capable of network transmission as sent by the input device 230, the data packets 250 are directly transmitted across the network 140 for transmission to the output display device 160 as described above and with reference to FIG. 1.

2. Non IP-Enabled Data Packets

If the data packets 250 are not in a network transmission format, the command receiver 210 encapsulates the end user control command 260 with the identifying information of the output display device 160 to be controlled into a data packet 250 capable of network transmission using the data look-up table 220 in the manner described above. The command receiver 210 transmits the data packet 250 to the network 140 for transmission to the output display device 160 as is described above in FIG. 1.

In another embodiment, the command receiver 210 receives content descriptive metadata from the content server 130 via the network 140. For example, if the content descriptive metadata had been sent in HTML format, the input device 230 can use its internal web browser to display the content descriptive metadata information. In one embodiment, the content descriptive metadata contains information regarding the output stream currently displayed on the output display device 160. One example of a display of content descriptive metadata is shown in FIG. 5, which is described in further detail below. In another embodiment, the content descriptive metadata contains navigational menu options for the content offered by the content server 130 as described above and with respect to FIG. 1.

Figure 3:
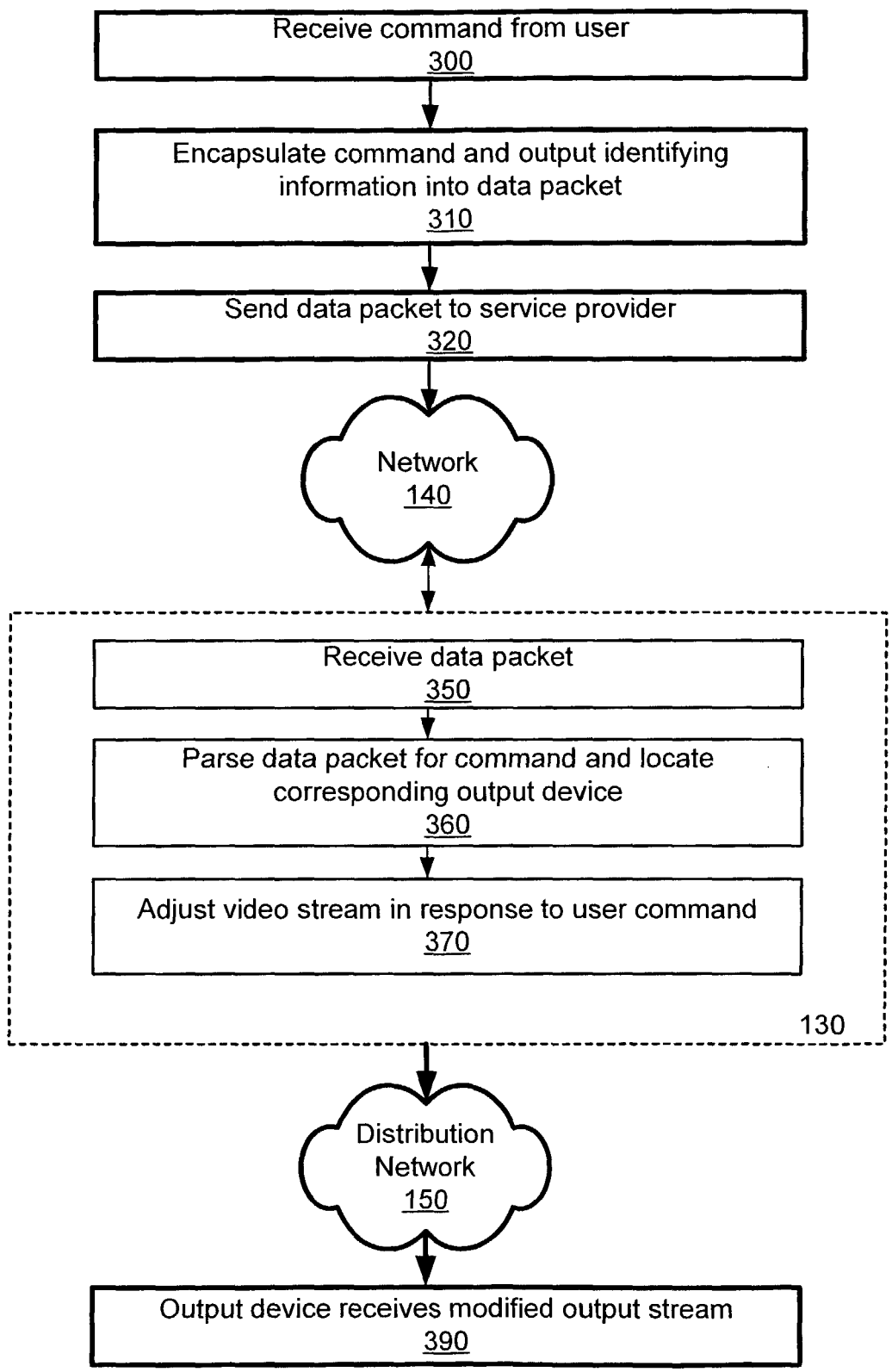
FIG. 3 is an illustration of a method for processing an end user control command according to an embodiment of the present invention.

FIG. 3 is an illustration of a method for processing an end user control command according to an embodiment of the present invention. In Step 300, the input device 170 receives the control command from the end user for altering the output stream displayed on the output display device 160. The input device 170 captures the end user control command and sends it to a command receiver. In one embodiment, the input device 170 has static, pre-programmed control inputs (e.g., buttons). In another embodiment, the input device 170 is switched from conventional functionality to that of content transport functionality by using, for example, soft keys, changing the touch screen appearance or other similar methods. Once the command receiver receives the end user control command, the command receiver encapsulates 310 the end user control command along with the output display device 160 identifying information into a data packet.

In Step 320, the command receiver converts the data packet into a network appropriate protocol packet. This network protocol packet containing the end user control command is then transmitted across a network 140 to the content server 130. The content server 130 can send content descriptive metadata via the network 140 to the command receiver 210. The content server 130 contains a command module 120. The network protocol data packet is received by the command module 120 in Step 350.

The command module 120 parses 360 the sent data packet to retrieve the end user control command and the identifying information needed to locate the specific output display device 160 to be control by the end user command. The command module 120 determines which output display device 160 to be control by the end user control command by employing a data look-up table 110 containing records linking end user with output display device 160. The data look-up table 110 can be predefined or dynamically assigned during operation. The command module 120 forwards the parsed information to the content server 130.

In Step 370, the content server 130 alters the output stream of the identified output display device 160 in accordance to the end user control command. The modified output stream, in turn, is sent over the distribution network 150 to the output display device 160 that has been affiliated with the end user. In Step 390, the output display device 160 receives the altered output stream from the distribution network 150 and displays it to the end user, as desired.

In one embodiment, content descriptive metadata is sent along with the output stream. The information contained within the metadata packets can be displayed on the output display device 160. In another embodiment, the content server 130 sends the content descriptive metadata via the network 140 for display on the input device 170 as described above.

C. Input Device Integrated with WLAN Capability

Figure 4:
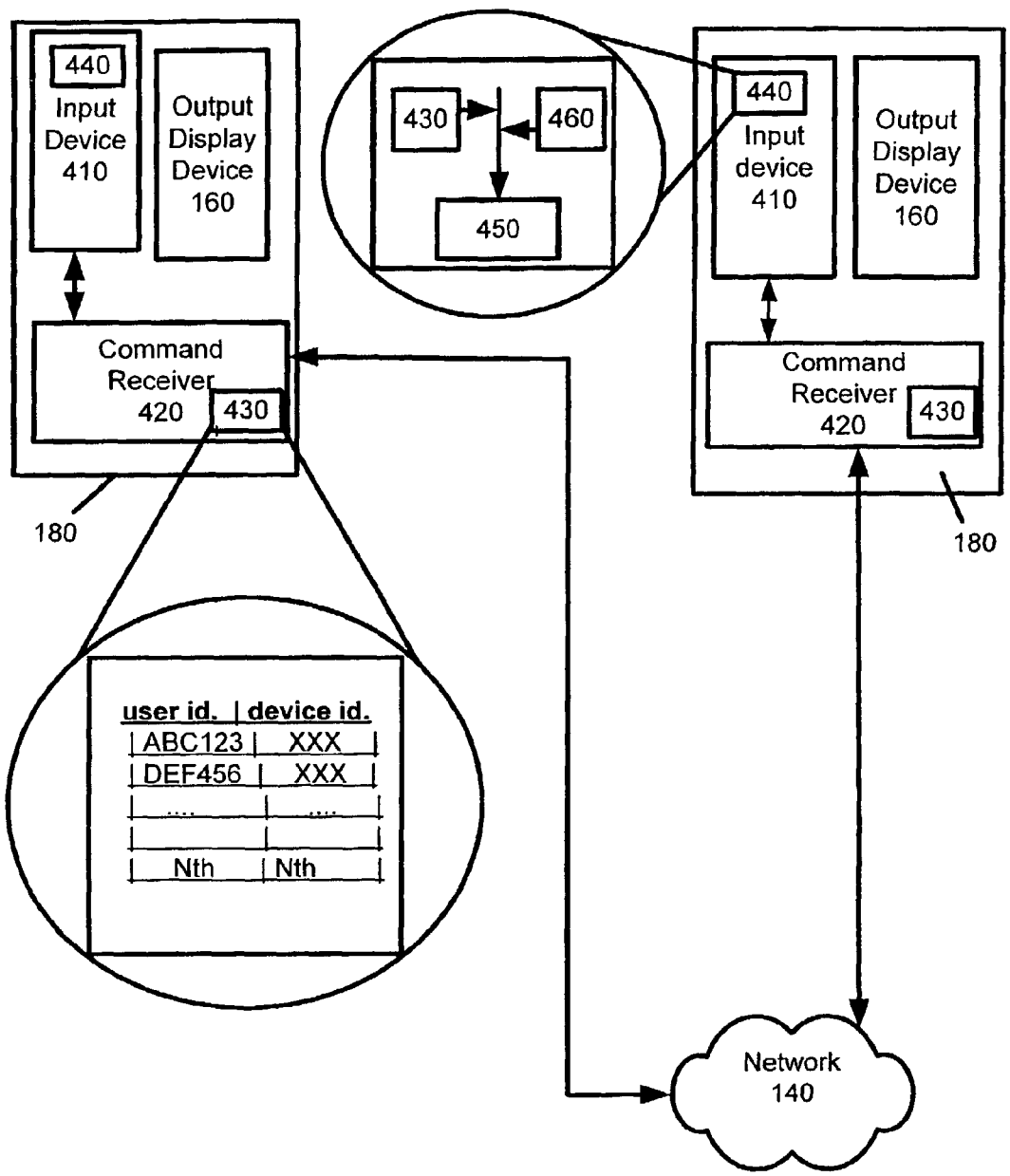
FIG. 4 is a system diagram illustrating return path communication according to another embodiment of the present invention.

FIG. 4 is a system diagram illustrating return path communication according to another embodiment of the present invention. The illustrated embodiment includes an input device 410 residing along with the output display device 160 inside the premises 180. The input device 410 includes a data packet-generating module 440. The data-generating module 440 receives the end user control command 460 and communicates to a command receiver 420 by means of data packets 450 the end user control command 460. In one embodiment, within the command receiver 420, there is a data look-up table 430 of data records. In another embodiment, the data packet-generating module 440 can also contain a data look-up table 430 of data records. The command receiver 420 sends data packets 450 to a network 140. The command receiver 420 also receives content descriptive metadata from a network 140.

In the illustrated embodiment, the data packet-generating module 440, which includes the data look-up table 430, as illustrated as a flow chart, uses program instructions to combine the end user control command 260 with the output display device 160 identifying information from the data look-up table 430 into data packets 450. In another embodiment, the data packet-generating module 440, which does not include the data look-up table 430, uses program instructions to send only the end user control command 260 into data packets 450.

In the illustrated embodiment, the command receiver 420 can be a wireless local area network (WLAN) access point. The functionality of interfacing with the input device 410 can be software that is added to a conventional access point. The command receiver 420 is, typically, located within the same premises 180 as the input device 410 but need not be. The command receiver 420 can be a personal computer with a high speed Internet connection such as, for example, a digital subscriber line (DSL) or a cable-modem connection. Another type of command receiver is a wireless access point such as an IEEE 802.11(b) wireless Ethernet device.

In this embodiment, the end user enters a command 460 into the input device 410 in order to control the output stream displayed on the output display device 160. The input device 410 may be any handheld mobile wireless digital device into which an end user could enter a control command 460 such as those devices described above with reference to FIG. 2. The input device 410 then transmits the end user control command 460 via the wireless connection to a command receiver 420 that is also fitted with a transceiver.

The data packet-generating module 440 is configured to be in a mode to accept commands 460 that corresponds to functions the end user would like to control the output display device 160 such as those aforementioned functions discussed above in FIG. 2. The input device 410 is equipped with a transceiver that transmits and receives from a WLAN, in Bluetooth protocol, or with any other suitable wireless connection. The type of wireless connection used is typically dependent upon the location (i.e., the home or business) and the end user's requirements for speed, security, and distance.

1. IP-Enabled Data Packet

In another embodiment, the input device 410 in conjunction with the data-packet generating module 440 located within the input device 410 produces data packets 450 capable of network transmission. In this embodiment, the end user enters the control command 460 into the input device 410. The output display device 160 identifying information is housed in a data look-up table 430 contained within the data packet-generating module 440. One method of grouping the identifying information for the output display device 160 with the end user involves employing this data look-up table 430. In one embodiment, the data look-up table 430 correlates the end user with the output display device 160 into fields of the data records which correspond to the data records in the data look-up table 110 housed in the command module 120 as described above.

The data look-up table 430 can be populated with the identifying information sent by the input device service provider who receives the data from the content service provider via an agreement. In one embodiment, the content service provider and the input device service provider exchange customer information so that the end user's output display device 160 from the content service provider can be affiliated with the end user's input device 410 from the input device service provider. This information can then be used to populate the records of the data look-up table 430 correlating the end user with a particular output display device 160.

The command receiver 420 determines whether the incoming data packets 450 from the input device 410 are ready for network transmission as sent. One format for the data packets 450 is IP but other data structures or protocols are possible and may be utilized. If the data packets 450 are in the appropriate network format, they are transmitted to the network 140 for transmission to the output display device 160 as was described above for FIG. 1.

2. Non IP-Enabled Data Packets

If the data packets 450 are not in an acceptable network transmission format when received by the command receiver 420, the command receiver 420 encapsulates the end user control command 460 with the identifying information of the output display device 160 to be controlled into a data packet 450 acceptable for network transmission. To correlate the identifying information of the end user with the output display device to be controlled, the command receiver 420 utilizes the data look-up table 430 in the aforementioned manner described above. The command receiver 420 then transmits the data packet 450 to the network 140 for transmission to the output display device 160 as was described above.

In another embodiment, the command receiver 420 receives content descriptive metadata from the content server 130 via the network 140. For example, if the content descriptive metadata is sent in HTML format, the input device 410 can use its internal web browser to display the content descriptive metadata information. In one embodiment, the content descriptive metadata contains information regarding the output stream currently displayed on the output display device 160. One example of a display of content descriptive metadata is shown in FIG. 5, which is described in further detail below. In another embodiment, the content descriptive metadata contains navigational menu options for the content offered by the content server 130 as described above and with respect to FIG. 1.

D. Display of Content Descriptive Metadata Information

FIG. 5 is an illustration of a display of content descriptive metadata information according to one embodiment of the present invention. In one embodiment of the present invention, the content server 130 sends the output stream to the output display device 160 and sends a content descriptive metadata to the input device 170. The content descriptive metadata contains information concerning the output stream being shown on the output display device 160. If the content descriptive metadata is sent in HTML format, the input device 170 uses, for example, its internal web browser to display the output stream information on the display of the input device 170.

For example, if output display device 160 is showing a pay-for-view movie, the display of the input device 170 shows, for example, the title of the movie, the year of production, the length of the movie, movie genre, movie director, screenwriter, rating of the movie, a short plot or any other information that the end user might find useful. In addition, the display of the input device 170 can, in real-time, show the time elapsed in the movie playing. The time elapsed can by shown by, for example, a progress bar 510 that fills in as the movie progresses. For example, at the beginning of the movie, the progress bar 510 will be empty and by the end of the movie, the progress bar 510 will be completely filled in. The progress bar 510 can further be responsive to user initiated transport controls, such as fast-forward and rewind. In addition, the end user can use the inputs on the input device 170 to select or to request from the content server 130 portions of the content descriptive metadata shown. For example, the end user can elect to have only the title and progress bar 510 displayed.

In another example, if the output display device 160 is showing a live sporting event, the display of the input device 170 can show, for example, the teams, background and game-related statistics, the location of the event, the weather at the location, and any other information useful to the end user. In addition, the display of input device 170 can, in real time, show the score of the event as well as the time remaining in the event.

While the present invention has been described with reference to certain preferred embodiments, those skilled in the art will recognize that various modifications may be provided. Variations upon and modifications to the preferred embodiments are provided for by the present invention, which is limited only by the following claims.

What is claimed is:

1. A method comprising:
   encoding, at a command receiver, a control command to adjust an output stream into a network transmissible data packet; and
   sending the data packet from the command receiver to a content server via a two-way communication path;
   wherein the control command is configured, responsive to use by the content server, to cause the content server to:

adjust an output stream by at least adding metadata descriptive of content transmitted on the output stream;

transmit the adjusted output stream from the content server to an output device via a one-way communication path;

transmit the metadata to an input device via the two-way communication path responsive to the control command, wherein the metadata represents static content descriptive information or dynamic content descriptive information, or combinations thereof; and dynamically assign the output device identification to at least one field within a data look-up table in association with the control command responsive to an absence of the identification in the data look-up table.

2. The method of claim 1 wherein the control command is further configured to cause the content server to adjust the output stream by overlaying the metadata descriptive of the content.

3. The method of claim 1 wherein the encoding further comprises including the identification of the output device with the control command prior to sending the data packet from the command receiver to the content server.

4. The method of claim 3 further comprising transmitting the control command from the input device.

5. An article of manufacture comprising a non-transitory computer-readable medium having stored thereon computer-executable instructions that configure a processing device to:

inspect a data packet to identify a control command;

analyze a data look-up table to associate the control command with at least one output device identification (ID), wherein if the output device ID is not detected in the data look-up table then access a database to determine the output device ID to dynamically assign the output device ID to one or more fields within the data look-up table;

alter an output stream comprising content by adding metadata descriptive of the content according to the control command to produce a modified output stream; and transmit the modified output stream to an output display device.

6. The article of manufacture of claim 5 wherein the computer-executable instructions further cause the processing device to alter the output stream by overlaying the metadata descriptive of the content according to the control command.

7. The article of manufacture of claim 5 wherein the computer-executable instructions further cause the processing device to transmit the metadata descriptive of the content to an input device responsive to the control command.

8. The article of manufacture of claim 6 wherein the overlying metadata is for display on the output display device.

9. The article of manufacture of claim 5 wherein the computer-executable instructions further cause the processing device to terminate delivery of the modified output stream to the output display device in response to the control command.

10. The article of manufacture of claim 5 wherein the computer-executable instructions further cause the processing device to prompt a user to enter the output device ID to dynamically assign the output device ID to the one or more fields within the data look-up table.

11. A system, comprising:

a command module configured to receive a data packet from an input device via a wireless network and inspect the data packet to extract a control command and information identifying an output device;

wherein the control command is configured to cause a content server to:

alter content by adding metadata representing static content descriptive information or real-time content descriptive information, or combinations thereof;

modify a transmission of altered content in real-time;

transmit the altered content to the output device via a distribution network, wherein the distribution network is independent of the wireless network;

according to the control command, transmit the metadata to the input device via the wireless network; and dynamically assign a record of the output device to one or more fields within a data look-up table in association with the control command if the record of the output device is not detected in the data look-up table.

12. The system of claim 11, further comprising a data look-up table including a data record adapted to store identifying information associated with the output device and identifying information of users subscribed to a wireless service provider managing the wireless network.

13. The system of claim 11 wherein the command module is further configured to determine whether the control command is formatted in a protocol compliant with network transmission.

14. An apparatus comprising:

a receiver configured to receive a packet via a two-way communication connection over a data network, the packet including a control command configured to cause a content server to alter content; and a command module configured to inspect the packet for the control command and information identifying an output device and inspect a data look-up table to associate at least one output device record with the control command;

responsive to the control command, the content server configured to:

alter content by adding metadata descriptive of the content responsive to the control command;

transmit the altered content in an output stream to the output device;

transmit the metadata descriptive of the content to an input device via a wireless network; and dynamically assign the output device record to one or more fields within the data look-up table in association with the control command responsive to the output device record not being detected in the data look-up table.

15. The apparatus of claim 14 wherein the data look-up table further comprises:

an end user field to identify an end user issuing the control command;

wherein the data look-up table is configured to associate the output device record with the end user.

16. The apparatus of claim 14 wherein the content server includes a subscriber database configured to provide identifying information corresponding to the output device associated with at least one premises.

17. The apparatus of claim 15 wherein the input device is associated with the end user.

18. The method of claim 1 wherein the control command is further configured to cause the content server to store instructions on capabilities of the output device to receive or process the metadata descriptive of the content.

* * * * *

UNITED STATES PATENT AND TRADEMARK OFFICE
CERTIFICATE OF CORRECTION

| | | |
|---|---|---|
| PATENT NO. | : 7,908,631 B1 | Page 1 of 1 |
| APPLICATION NO. | : 10/393707 | |
| DATED | : March 15, 2011 | |
| INVENTOR(S) | : Zhang et al. | |

It is certified that error appears in the above-identified patent and that said Letters Patent is hereby corrected as shown below:

Title page, item (56), under "Other Publications", in Column 2, Line 6, delete "Specificatio," and insert -- Specification, --.

Signed and Sealed this

Nineteenth Day of July, 2011

David J. Kappos
*Director of the United States Patent and Trademark Office*